UNITED STATES PATENT OFFICE.

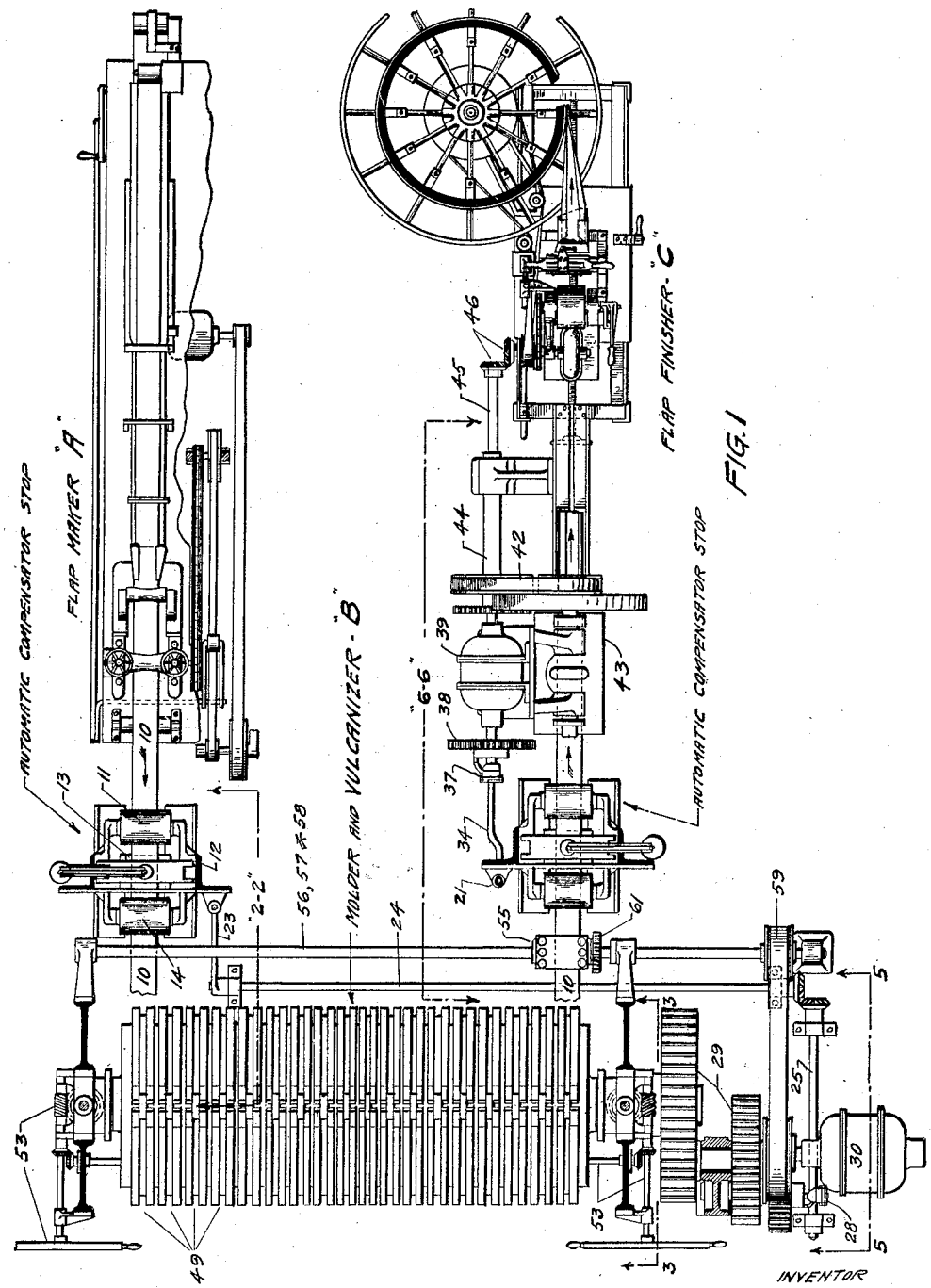

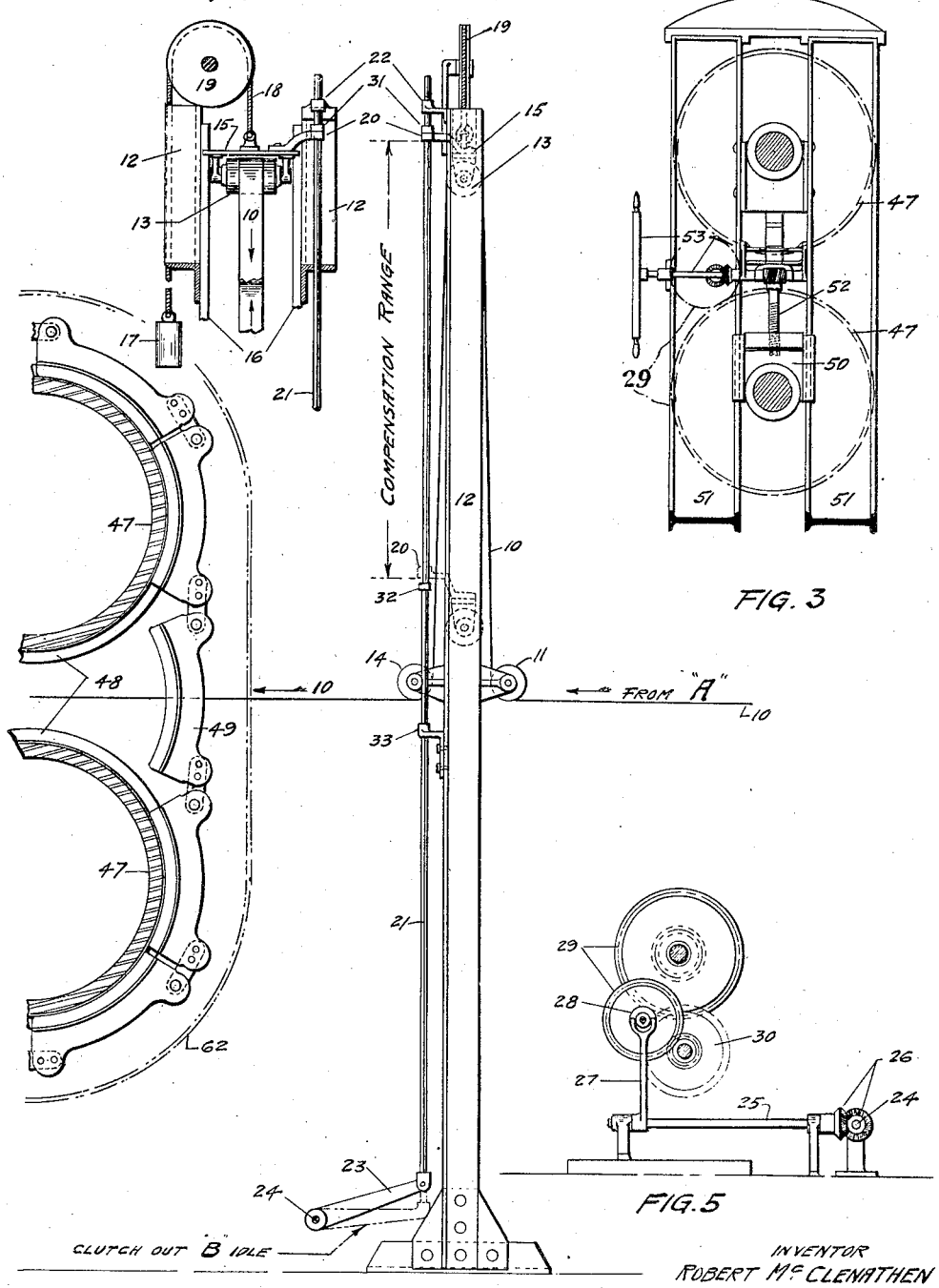

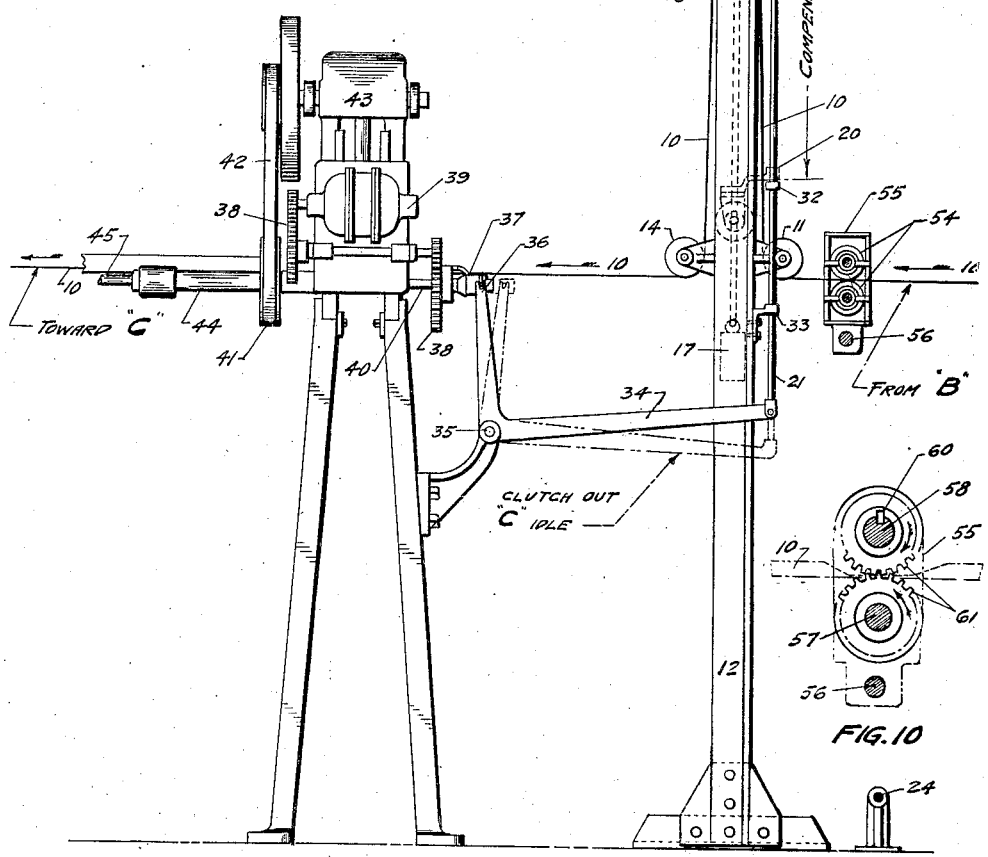

ROBERT McCLENATHEN, OF AKRON, OHIO, ASSIGNOR TO KELLY-SPRINGFIELD TIRE COMPANY, OF AKRON, OHIO, A CORPORATION OF NEW JERSEY.

MOLDING MACHINE.

1,427,217.  Specification of Letters Patent.  Patented Aug. 29, 1922.

Application filed January 31, 1922. Serial No. 533,087.

*To all whom it may concern:*

Be it known that I, ROBERT McCLEN-ATHEN, a citizen of the United States, residing at Akron, in the county of Summit and State of Ohio, have invented certain new and useful Improvements in a Molding Machine, of which the following is a specification.

This invention relates to the art of forming strips of moldable material into an endless belt-like form by machine process, thereafter molding the same to a predetermined contour while still in continuous length, and finally to sever the molded stock into gauged lengths and otherwise prepare same for its intended service—the entire process being effected by semi-automatic machine elements arranged in coacting relation.

While the invention is adapted to be used for many purposes other than the one chosen in the interest of illustrating a practical application of it to the production of a specific and well known article of commerce, the present description, prefers to relate it to the manufacture of tire flaps.

In general, this invention embraces certain specific improvements in the molding machine, indicated generally by "B" in Fig. 1, over those included in my co-pending application Serial No. 513986 filed November 9th, 1921 Patent 1,423,349 of July 18, 1922. In addition, it discloses associated mechanism whereby an operable combination is attained between a device for initially forming the flap stock, indicated generally by "A" in Fig. 1, which device is that forming the subject of Letters Patent No. 1302660 of May 6, 1919, with element "B," the Molding and vulcanizing machine, and a device indicated generally by "C" in Fig. 1, which device finishes the molded product by cutting it to gauge and performing other operations thereon, all as fully disclosed in my prior invention forming the subject of Letters Patent No. 1321139 of November 11, 1919.

Heretofore flaps have never been made and finished continuously. It has always been the practice to first form the "green" or uncured material into endless laminated bands on such a machine as, for instance, indicated by "A," Fig. 1, the material delivered therefrom being reeled on spools and thereafter unreeled into a step-by-step vulcanizer, such, for instance, as that shown in Patent No. 1179738 of April 18, 1916, or, into a continuously running molding machine, such, for instance, as the type disclosed in my co-pending application Serial No. 513986. The stock having passed through the molding and vulcanizing machine was heretofore again temporarily reeled but only to be again unreeled into a finishing machine, such, for instance, as that indicated as element "C," Fig. 1. It being obvious that this intermittent process of manufacture is crude and unscientific, and above all, wasteful of human effort, hence conducive to high manufacturing costs.

The purpose of this invention having been made apparent, it will be understood that the preferred embodiment, illustrated in the accompanying drawings and fully described hereafter, is offered by way of illustration only of the principle involved; it being apparent that a wide latitude in the selection of mechanical elements would undoubtedly exist in favor of those skilled in the art to accomplish the desired end without departing from the scope and spirit of the invention as disclosed and further defined in the appended claims.

In the accompanying drawings:

Figure 1 is a plan view of the associated elements, showing the progress of the material throughout its several operations.

Fig. 2, is a partial sectional view through "2—2," showing the automatic compensator stop regulating the flow of the stock from the element "A" to vulcanizer "B."

Fig. 3, is an enlarged partial sectional elevation through "3—3," showing the means for separating the drums of the vulcanizer "B" to put the chains under tension.

Fig. 4, is a partial front view of the top of either of the automatic compensator stops, showing the stock roller.

Fig. 5, is a partial end elevation through "5—5," showing part of the vulcanizer drive gear and its automatically operated clutch.

Fig. 6, is a side elevation through "6—6," showing a portion of the element "C" with its automatically operated clutch and the relation thereto of the automatic compensator stop regulating the flow of the stock from the element "B" to the finisher "C."

Fig. 7, is a general cross section through the flap, as it is formed by "A."

Fig. 8, is a general cross section through the flap, as it is finally molded by "B."

Fig. 9, is fragmental section through the periphery of one of the molding drums, showing the molding action of the chain linkage on the flap confined within a groove of the drum.

Fig. 10, is a sectional elevation looking on the geared end of the flap pulling device between "B" and "C."

Proceeding with the detailed description in the order of progress of the stock from its formation by "A" to its finished state through "C":—

The stock having been mechanically formed from rubberized fabric into a belt-like strip 10 by the flap maker "A", (the operation of which is fully disclosed in Patent No. 1302660) passes through a device interposed between "A" and "B". Said device is termed an automatic compensator stop and automatically stops element "B" when same has drawn up all the stock that has been prepared by "A", thus avoiding the breaking of the flap when shortage occurs. The flap stock is threaded progressively over and under the vulcanizer drums of "B" and confined therein by the circulating pressure chains (all as more fully hereafter described). The revolving drums deliver the molded and vulcanized stock to the element "C" (disclosed in Patent No. 1321139) through a second and similar compensator to that above described and which has a like functional relation as between the elements "B" and "C"; that is, when "C" has exhausted the excess prepared stock, that element is automatically stopped.

At this point it is explained that the ideal condition of operation of "A", "B" and "C" in combination, would be to rate their respective output capacities equally; that is, element "A" to produce at exactly the drawing-in rate of "B", and "C" to finish at the same rate. Now this condition cannot be met in practice for several reasons; chief among which is that the element "A" is not capable of uninterruptedly supplying formed flap, for the reason that the various plies of stock entering into the fabrication of the laminated structure must be spliced end to end as their lengths become exhausted. This splicing operation, of course, requires that the machine "A" be momentarily stopped; the period depending upon the dexterity of the splicing operator. It is therefore apparent that continuous flow of stock at a uniformly reliable rate between "A" and "B" cannot be expected, and that, if the stock were led direct into the continuously running vulcanizer "B", the stoppage of "A" would result in the flap being broken unless "B" were quickly stopped. Also, considering the delivery of the vulcanized stock to "C" after its passage through "B", it will be appreciated that the intermittent, though brief interruption in the drawing-in rate of stock by "C", due to the nature of its operations, (all as set forth in my Patent 1321139) would cause breakage of the stock between "B" and "C". Now, to fully meet the above conditions, my associated mechanism permits each element, "A", "B" and "C", to be independently driven, and in order that each may do its own work as far as possible without compromising the normal running of the other two, or be affected by their irregularities, this invention associates the progress of each with the other by interposing a compensator device between each, whereby interruptions or irregularities in their respective productions over a reasonable length of time may be reconciled. But if the interruption or irregularity be considerable on the part of any one, the compensator will automatically stop such of them as necessary to prevent injurious consequences. Also, the complemental function of the same safety device again automatically sets into motion the element previously rendered inoperative, when the occasion for interruption has passed.

*Automatic compensator stop between "A" and "B".*

The flap stock 10, from "A" in its path to "B", is passed under a roller 11 suitably journaled in a bracket fixed to the frame 12 which is in turn firmly anchored to the floor between "A" and "B". From roller 11 the stock passes upward and over the floating roller 13, thence down and under another fixed roller 14, a counterpart of 11.

The floating roller 13 is journaled in a slidable carriage 15 retained within guides 16 on either leg of support 12 (see Fig. 4), said carriage being counterbalanced to resist the pull-down exerted by the stock 10 when it is being drawn into "B" under normal conditions and when being produced by the machine "A" fast enough to supply "B". The counter-balance weight 17 exerting its influence on 15 by a rope 18 passing over a sheave 19 at the top of support 12. Projecting from carriage 15 is a stop arm 20 having a bored extremity slidably engaging the vertical clutch rod element 21 which is a part of the positive stop system for "B".

The rod 21 is slidable vertically within restricted limits and has its top slidably retained within a suitable guide 22; its lower end engaging the free end of a rocker arm 23 which is keyed to rocker shaft 24 running close to the floor line across the front of "B" and transmitting rotation to a second rocker shaft 25 through bevel gearing 26 (see Figs. 1, 2, 5). At the extremity of 25 is a keyed-on rocker arm 27 functioning as a clutch shifter to operate clutch 28 on one of the gears of the train 29 operating "B" through the agency of a continuously running motor 30. It thus being apparent that the operation of "B" is controlled by the above mentioned clutch mechanism, as itself regulated by the behavior of the sliding carriage 15.

As previously stated, the stop arm 20 on 15 slidably engages rod 21, and it will now be noted that 21 has two collars fixed thereon, 31 near its top and 32 at about its midlength. These collars are adapted to be engaged by arm 20 within the extreme limits of that member's travel, and by reason thereof, to move 21 vertically up or down, as the case may be, to throw in and out the clutch on "B," as follows:

In Fig. 2 the carriage 15, with stop arm 20, is shown in full lines as at the top of the slide, which means that a considerable portion of excess stock 10 is available within the compensator and that the clutch is "in" on "B" and the arm 23 in the high or "in" position, and "A" and "B" working continuously and in step. Now assume that "A" suddenly stops, as for a splicing operation, it will be seen that "B" continues to draw on the excess stock 10 within the compensator at the expense of gradually exhausting it and consequently pulling down the carriage 15 within the travel marked "Compensation range" in Fig. 2. If the suspension of "A" is continued, the carriage will be drawn all the way to its bottom range, until, as indicated in dotted lines, arm 20 contacts with collar 32, whereby a further movement presses rod 21 downwardly depressing 23 to its low or "off" position whereby the clutch 28 on "B" is thrown "out" and that member immediately stopped. This position, clutch "out" and stock exhausted, assumes that both "B" and "A" are idle. If now "A" again starts producing stock the excess will be pulled up within the compensator by the action of the counterweight 17, "B" not being affected by this action until the stop arm 20 in its upward course makes contact with the upper collar 31 whereby the rod 21 lifts arm 23 and necessarily throws "B" into gear, all as previously explained.

*Automatic compensator stop between "B" and "C."*

Having so fully described the gearing for relating the operation of "B" to "A," that for relating "C" to "B," being substantially identical, will be briefly treated. In fact, the automatic compensator stops are identical and the same numerals heretofore used will be repeated for corresponding parts without repetition of description (see Fig. 6, as related to Fig. 2). Attention is invited to a lower rod guide 33 for rod 21, common to both compensator elements.

The principal distinction existing in the compensator between "A" and "B," from that now treated between "B" and "C," is that the first mentioned operates to control "B," whereas the latter controls "C" only.

In Fig. 6 the carriage 15 is at the top, indicating that the maximum excess of stock 10, being now the vulcanized flap from "B," is accumulated and that "B" is in operation and likewise "C." The lower end of rod 21 here terminates in contact with the end of the longer arm of bell crank lever 34, journaled at 35 on a part of the frame of "C," and having a clutch engaging end 36 adapted to shift a suitable clutch 37 on one of the gears of a train 38 operating "C" through the agency of a continuously running motor 39.

As the detail operation of element "C" is not part of this invention, attention is directed to the patent relative thereto, No. 1321139; but, in view of the fact that certain minor modifications to the driving gear of said patented mechanism are deemed desirable to relate it to the control of the automatic stop of my present invention, this disclosure includes, in Fig. 6, the small changes desired. A shaft 40 which is directly controlled by the clutch 37 represents the power transmitting member which drives the entire device "C." On shaft 40 is a pulley 41 on which a belt 42 operates to drive the punching end 43 of "C." Shaft 40 terminates in an enlarged sleeve portion 44 adjacent 41. Slidably keyed within 44 is the terminus of the main shaft 45 extended toward the main portion of "C" and driving that machine through bevel gears 46. Except as thus recited, the gearing of "C," as covered by the patent thereon, remains unaltered. From this description it is obvious that when clutch 37 is "out" the motor 39 may run continuously, yet the entire "C" device, including its component punch member 43, will become inoperative.

Again referring to Fig. 6 and assuming that "B" stops producing flap stock, it is apparent that "C" will continue to operate and exhaust the excess within the compensator until the arm 20 depresses collar 32, thus throwing out clutch 37 and stopping "C" altogether. Once stopped, "C" remains inoperative until "B" starts and accumulates enough excess stock within the compensator to cause the clutch of "C" to be thrown "in" by the upward travel of 15 and that machine set in motion again.

*Molder and vulcanizer "B."*

The vulcanizer "B" comprises a pair of hollow, spaced-apart drums 47, arranged to be internally heated by any well known method and revolubly mounted in parallel relation, one above the other, and driven at the same speed in one direction by the gear train 29, previously described. The outer circumferences of drums 47 are grooved at 48 (see Fig. 9), said grooves being alined one above the other when the drums are axially positioned. These grooves are shaped to impart the desired cross sectional form to the flap stock 10 when said stock is confined and pressed therein by the articulated molding members 49 which are arranged as endless belts, one of which circulates within each of a pair of alined grooves of the two drums 47 (see Figs. 1—2—9). Fig. 1 shows the top view of "B" having all the molding members 49 positioned.

As the flap requires definite pressure to mold it as it passes over the heated drums and becomes gradually vulcanized within grooves 48, provision has been made for exerting uniform and selective pressures by members 49. To attain this (see Fig. 3) the lower drum journal boxes 50 have been slidably mounted within guides on the end standards 51, whereby vertical adjustment may be had by means of substantial screws 52; one end operating directly upon 50, the other being revolubly anchored below the upper drum bearings. Rotation of 52 is effected by means of a conventional worm and worm wheel gear manipulated by suitable transmission from hand wheels disposed at either end of the machine; said journal moving gear being cross connected (see Fig. 1) whereby parallel motion may be imparted to both journals 50 by turning either hand wheel. This transmission gearing, being obvious from the description and drawings, is not described in detail and is indicated generally by numeral 53 in Figs. 1 and 3.

*Flap pull-out gear on "B."*

In view of the tendency of the flap stock to stick to the groove 48 at the point where it is desired to pull it out from the machine "B," and recognizing the desirability of relieving the pull-in mechanism of "C" from the burden and strain of separating the flap from the groove, a pull-out device (see Figs. 1—6 and 10) has been provided. This device consists of a pair of rollers 54 mounted on a horizontally slidable carriage 55, the carriage being mounted on a series of three vertically alined horizontal shafts parallel with, and extending across the face of the machine "B." The lower shaft 56 is merely a guide rod steadying the carriage; also the middle shaft 57 serves a similar purpose except that it also serves as an axle on which lower roller 54 is slidably mounted. The upper shaft 58 is a power shaft rotated at such a speed by belt drive 59 from the driving gear of "B" that the rollers 54 will draw out the flap at the rate of production of "B." The top roller 54 is slidably keyed to shaft 58 at 60 and rotates therewith. Rollers 54 are made to rotate together at the same speed by means of intermeshing gears 61.

It is thus apparent that the carriage 55 may be positioned at will along the face of the machine "B" for the purpose of drawing out the flap at any desired groove before it has run the full course of all the grooves. It here being noted that the stock is led into the "B" element in the first grooves, just as it is delivered from "A," and travels progressively from groove to groove toward the "C" end of "B." In the event of having a quick curing or "special" flap to make, it may be desirable to curtail its passage through "B" by pulling it out before the full sequence is completed, in which event carriage 55 is placed at the appropriate point and the free end of the flap 10 fed within the rollers 54, from whence it passes direct to "C" and, if desired, over a suitable intermediate guide (not shown in the drawing).

In the drawing, Fig. 1, the formed flap coming out of "B" and leading through the pull-out rollers into "C" has been shown, for simplicity of illustration, as of the same projected width as the "green" flat stock formed by "A." In reality the stock at the point first mentioned would appear as in Fig. 8, it being noted that, once formed and vulcanized into V-shape, its contour will not be permanently affected by reason of being momentarily flattened out in passing through rollers 54.

*General operation.*

The operation of the machine having been made apparent to those skilled in the art by the foregoing, it remains only to explain several procedural or selective phases in the actual running of the machine in full or partial combination with the component elements.

The desideratum in forming a tire flap in the "curing" is that it be delivered with a cross sectional set generally in agreement with that part of the inner tube it protects, as also with a diametrical contour approximating that of the rim upon which it is to be used. The cross sectional set is that imparted by the grooves 48 with their coacting pressure members 49. The diametrical contour being, of course, that of the diameter of the grooved drums. In order that the diametrical shape of the flap may be preserved, it is particularly noted that there is no tension put upon the stock between drum and drum; the stock is merely frictionally pressed within the grooves over their semi-circumference by the circulating chain members and drawn in, and progressively from, the "A" end of "B" towards its "C" end by that action alone. In threading in the end of the stock made by "A" the process is as described in my previously mentioned application, Serial No. 513986; that is, the stock is successively threaded into each groove of each drum under the molding chains then crossed over within the clearance space between the drums into adjacent grooves, taking care that an appreciable excess or "slack" remains at the cross over. This excess assuring that the stock as it progresses toward the "C" end, and without material "creeping" within the zones of pressure of the molding chains, will never pull on its length between drum and drum—thereby never destroying the desired diametrical contour.

In Fig. 1 the molding chains 49 are shown close together, but in fig. 9 they are illustrated as in more usual spacing. When it is understood that the flap may be "taken off" at any groove before running its full course, the open spacing of the grooves and chains will present the advantage of ample clearance for the flap to be drawn out between any two moving chains, this spacing, of course, being a matter of choice depending upon the manner of operation and character of the stock run.

It is apparent that the "A" and "C" devices may be used in combination with "B" at the expense of eliminating one or both of the compensators, but this expedient would be dangerous to the product and require great vigilance on the part of several operators who would be required to closely control each machine and constantly start and stop same to relate the irregularity of operation of any one to the other two.

If desired to run "B" in combination with either "A" or "C" separately, with the compensator interposed, that partial combined operation could be arranged to effect a great saving over the machines of the prior art.

In order to conserve the heat within the vulcanizer "B", so that "curing" may be effected in the flap as it crosses over from drum to drum, the entire device is usually insulated by a suitable heat retaining casing, generally indicated by 62 in Fig. 2.

From this specification it will be appreciated that my improved molding and vulcanizing machine, of itself, but more particularly in its preferred combination relation, represents a distinct and valuable addition to the art, and one which may be practiced through a great variety of mechanical adaptations to the purpose without departing from the basic conception as hereafter defined in the claims.

I claim

1. A molding and vulcanizing machine of the character described, comprising revolubly associated vulcanizer drums having alined grooves, endless pressure members conformable to and coacting with said grooves, and means for exerting selective tension on the pressure members.

2. A molding and vulcanizing machine of the character described, comprising revolubly associated vulcanizer drums having alined grooves, endless pressure members conformable to and coacting with said grooves, and means for exerting selective tension on the pressure members without inducing corresponding tension in the slack portion of the stock within the vulcanizer.

3. A molding and vulcanizing machine of the character described, comprising revolubly associated vulcanizer drums having alined grooves, a heat insulating casing over said machine, endless pressure members conformable to and coacting with said grooves, and means for exerting tension on the pressure members by separating the grooved drums axially in parallelism.

4. A molding and vulcanizing machine of the character described, comprising revolubly associated vulcanizer drums having alined grooves, endless pressure members conformable to and coacting with said grooves, and means for tensioning said pressure members, said means operating simultaneously on the bearings of one drum to slidably separate it from the other.

5. A molding and vulcanizing machine of the character described, comprising revolubly associated vulcanizer drums having alined grooves, endless pressure members conformable to and coacting with said grooves, means for exerting selective tension on the pressure members, and a stock pull-out device operably associated therewith.

6. A molding and vulcanizing machine of the character described, comprising revolubly associated vulcanizer drums having alined grooves, endless pressure members conformable to and coacting with said grooves, means for selectively tensioning said pressure members simultaneously, and a stock pull-out device associated with said machine, said device comprising friction rollers adapted to grasp and pull the stock from the drums.

7. A molding and vulcanizing machine of the character described, comprising revolubly associated vulcanizer drums having alined grooves, endless pressure members conformable to and coacting with said grooves, and a stock pull-out device comprising friction rollers, said rollers being rotated by means in synchronous relation with the production rate of stock through the machine.

8. A molding and vulcanizing machine of the character described, comprising revolubly associated vulcanizer drums having grooves, endless pressure members conformable to and coacting with each set of grooves, and a stock pull-out device adapted to withdraw vulcanized stock from the machine at the rate of production, said device being selectively positionable and operable at any desired location along the length of said vulcanizer machine.

9. In a device of the character described the combination with a device "A" for forming and supplying a vulcanizable stock member to a vulcanizer "B", of a device "B" for receiving the stock from "A" and molding and vulcanizing same, and means interposed between "A" and "B" whereby "B" is controlled automatically by the amount of surplus stock between "A" and "B" as affected by the drawing-in rate of "B".

10. In a device of the character described the combination with a device "B" for molding and vulcanizing a stock member, of a device "C" adapted to perform further operations on the stock drawn therein from "B", and means interposed between "B" and "C" whereby "C" is controlled automatically by the amount of surplus stock between "B" and "C" as affected by the drawing-in rate of "C".

11. In a device of the character described the combination with a stock making device "A", an intermediate stock molding and vulcanizing device "B" receiving stock from "A", a final operation device "C" receiving stock from "B", of means interposed between "A" and "B" and "B" and "C", respectively, said means automatically controlling the operation of "B" and "C" as affected by their respective drawing-in rates.

12. In a device of the character described the combination with a stock making device "A", an intermediate stock molding and vulcanizing device "B" receiving stock from "A", a final operation device "C" receiving stock from "B", of independent means interposed between "A" and "B" and "B" and "C", respectively, said respective independent means automatically and disassociatedly controlling the operation of "B" and "C" as self-affected by their respective drawing-in rates.

13. In a device of the character described the combination with a device "A" for forming and supplying a vulcanizable stock member to a vulcanizer "B", of a device "B" for receiving the stock from "A" and molding and vulcanizing same, and a stock compensator means interposed between "A" and "B", said compensator having floating means therein for compensating and uniformly tensioning a stock surplus within predetermined limits, and other means for automatically stopping device "B" when the surplus stock becomes exhausted and again starting "B" when a predetermined surplus is acquired.

14. In a device of the character described the combination with a device "B" for molding and vulcanizing a stock member, of a device "C" adapted to perform further operations on the stock drawn therein from "B", and a stock compensator means interposed between "B" and "C", said compensator having floating means therein for compensating and uniformly tensioning a stock surplus within predetermined limits, and other means for automatically stopping device "C" when the surplus stock becomes exhausted and again starting "C" when a predetermined surplus is acquired.

15. In a device of the character described the combination with a stock making device "A", and intermediate stock molding and vulcanizing device "B" receiving stock from "A", a final operation device "C" receiving stock from "B", of independent stock compensator means interposed between "A" and "B" and "B" and "C", respectively, said means having floating excess stock compensators therein adapted to hold a variable stock excess under uniform tension within predetermined limits, and other means for automatically stopping the respective devices upon which they operate when stock excess has become exhausted and thereafter automatically starting said respective devices when a predetermined excess is accumulated.

16. In a device of the character described the combination with a device "B" comprising a rotary type molder and vulcanizer having grooved drums and endless pressure members coacting with complemental registers in the drum members and adapted to draw in a stock article of indefinite length direct from a source of supply and to expel same from a different part of the machine "B" from the drawing-in part in a molded and vulcanized state, of an automatic compensator and stop device adapted to positively control the operation of the said device "B" as affected by the supply of stock available, substantially as described.

17. In a device of the character described the combination with a device "B" comprising a rotary type molder and vulcanizer having grooved drums and endless pressure members coacting with complemental registers in the drum members and adapted to draw in a stock article of indefinite length direct from a source of supply and to expel same from a different part of the machine "B" from the drawing-in part in a molded and vulcanized state, of a device "C" associated with "B" and adapted to perform a further operation on the stock from "B", and an automatic compensator and stop device adapted to positively control the operation of device C as affected by the supply of expelled stock available, substantially as described.

In testimony whereof I affix my signature.

ROBERT McCLENATHEN.